(12) United States Patent
Jensen

(10) Patent No.: US 11,950,603 B2
(45) Date of Patent: Apr. 9, 2024

(54) SLAUGHTERED PIG PART PROCESSING PLANT, AND A COUPLING FOR THE PLANT

(71) Applicant: FRONTMATEC GROUP APS, Kolding (DK)

(72) Inventor: Andreas Iskov Jensen, Sydals (DK)

(73) Assignee: FRONTMATEC GROUP APS, Kolding (DK)

( * ) Notice: Subject to any disclaimer, the term of this patent is extended or adjusted under 35 U.S.C. 154(b) by 330 days.

(21) Appl. No.: 17/439,216

(22) PCT Filed: Mar. 12, 2020

(86) PCT No.: PCT/EP2020/056668
§ 371 (c)(1),
(2) Date: Sep. 14, 2021

(87) PCT Pub. No.: WO2020/187691
PCT Pub. Date: Sep. 24, 2020

(65) Prior Publication Data
US 2022/0159978 A1 May 26, 2022

(30) Foreign Application Priority Data

Mar. 15, 2019 (DK) .............................. PA201970167
Mar. 25, 2019 (DK) .............................. PA201970184

(51) Int. Cl.
*A22C 17/00* (2006.01)
*A22C 17/02* (2006.01)
*A22C 18/00* (2006.01)

(52) U.S. Cl.
CPC .............. *A22C 17/02* (2013.01); *A22C 18/00* (2013.01)

(58) Field of Classification Search
CPC ......... A22C 17/02; A22B 7/003; A22B 7/002; B65G 47/22; B65G 17/20; B65G 47/244
(Continued)

(56) References Cited

U.S. PATENT DOCUMENTS 8,757,354 B2    6/2014   Hazenbroek
9,642,377 B2 *  5/2017   Van Steijn ......... A22C 21/0007
(Continued)

FOREIGN PATENT DOCUMENTS

EP    1191852 B1    9/2004
EP    1658774 A1    5/2006
(Continued)

OTHER PUBLICATIONS

International Search Report (16 Pages) from corresponding PCT Application PCT/EP2020/056668 dated Jun. 17, 2020.
(Continued)

*Primary Examiner* — Richard T Price, Jr.
(74) *Attorney, Agent, or Firm* — Crowell & Moring LLP; John C. Freeman

(57) ABSTRACT

A slaughtered pig part processing plant including a plurality of pig part processing stations and a conveyor supporting via respective couplings a plurality of spaced apart clamp structures, the conveyor advancing the couplings with a respective clamp structure in a machine direction (T) from a first station for introducing a pig part between jaws of a clamp structure, towards a last station for removing the bone of the processed pig part from the clamp structure, wherein in the said clamp structures being connected to the conveyor so as to allow for a turning movement of the clamp structures about a vertical axis (D), the processing plant including elongated guiding elements engaging the clamp structures or the couplings as they are advanced in the machine direction (T), for bringing about the turning movement about the vertical axis (D).

22 Claims, 13 Drawing Sheets

(58) Field of Classification Search
USPC .......................................................... 452/177
See application file for complete search history.

(56) References Cited

U.S. PATENT DOCUMENTS

| | | | |
|---|---|---|---|
| 9,775,362 B2 * | 10/2017 | Van Mil | A22C 21/0053 |
| 2012/0315834 A1 | 12/2012 | Van Der Steen et al. | |
| 2013/0029574 A1 | 1/2013 | Van Der Steen et al. | |
| 2013/0037380 A1 | 2/2013 | Hazenbroek | |
| 2013/0196584 A1 | 8/2013 | van den Berg et al. | |
| 2014/0202834 A1 | 7/2014 | Hazenbroek | |
| 2015/0366227 A1 | 12/2015 | van den Berg et al. | |
| 2016/0037787 A1 | 2/2016 | Van Der Steen et al. | |
| 2016/0058019 A1 | 3/2016 | Hazenbroek | |
| 2018/0014549 A1 | 1/2018 | Hazenbroek | |

FOREIGN PATENT DOCUMENTS

| | | |
|---|---|---|
| EP | 2981173 B1 | 5/2017 |
| EP | 2512254 B1 | 3/2019 |
| WO | 00/76323 A1 | 12/2000 |
| WO | 2011/074966 A1 | 6/2011 |
| WO | 2011/133028 A1 | 10/2011 |
| WO | 2012/102606 A1 | 8/2012 |
| WO | 2014/007607 A1 | 1/2014 |

OTHER PUBLICATIONS

Office Action (7 pages) from corresponding Danish Application PA 2019 70167 dated Oct. 13, 2019.

* cited by examiner

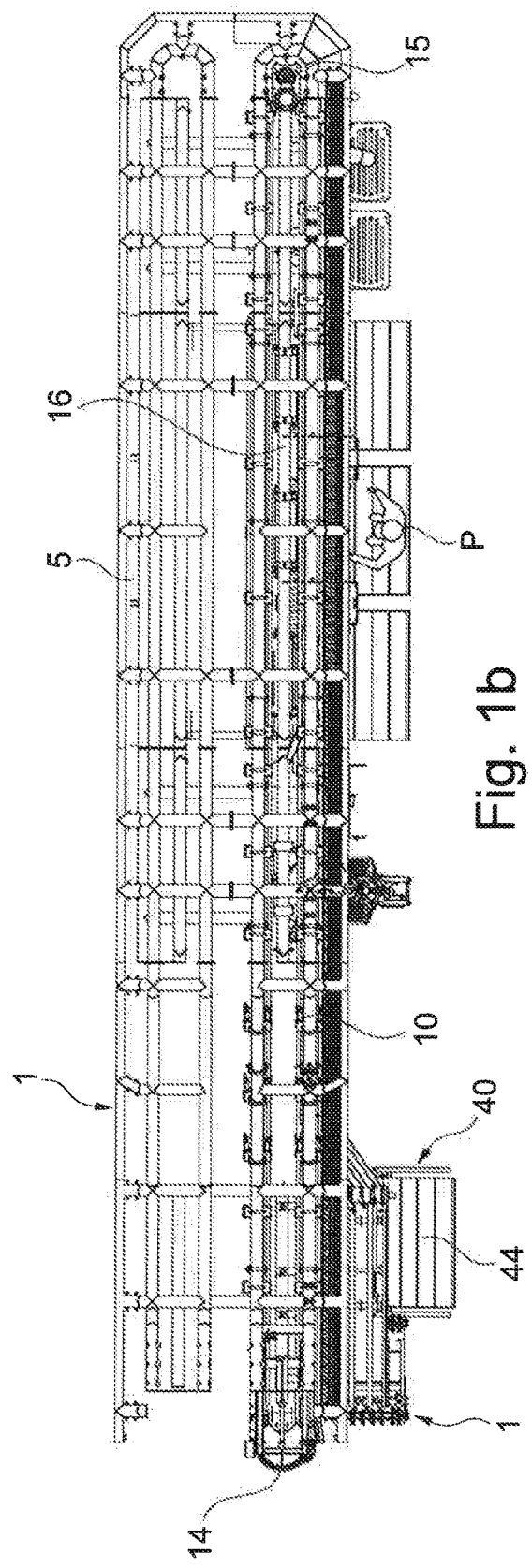
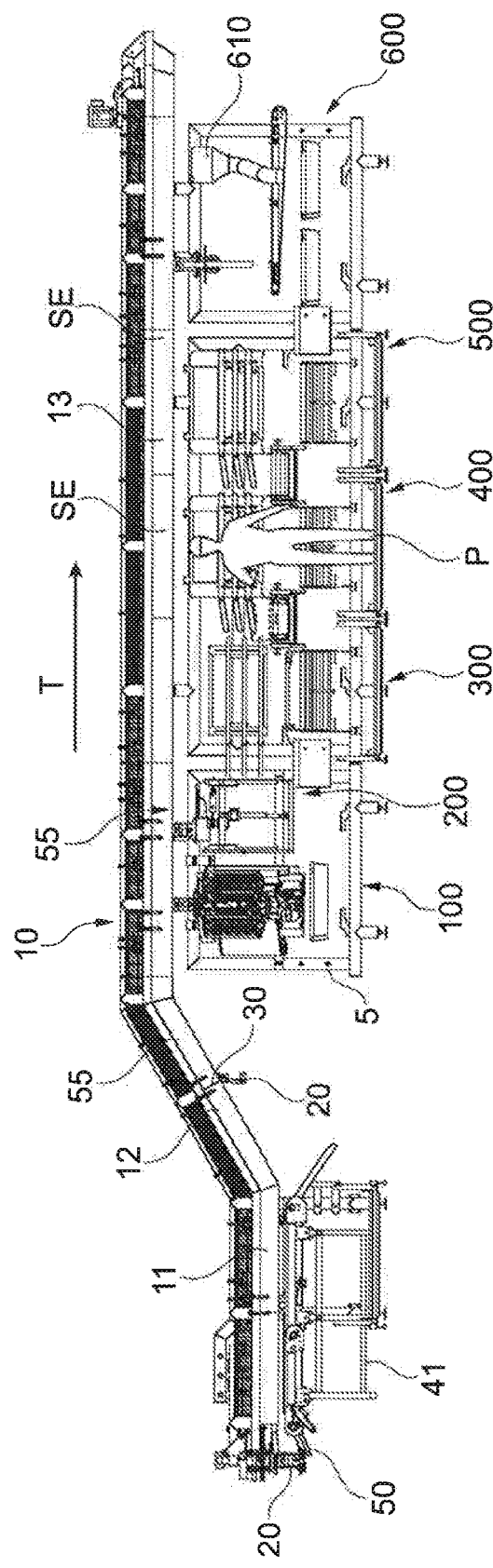
Fig. 1b
Fig. 1a

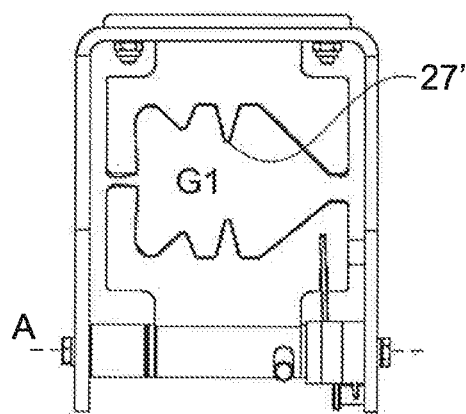
Fig. 2g(i)
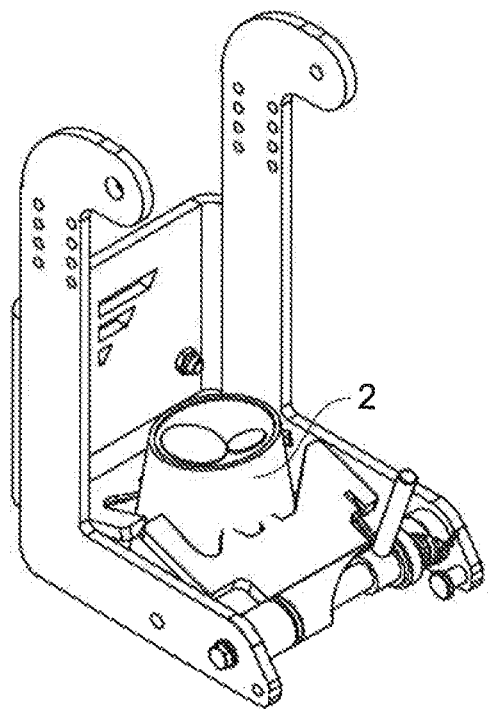
Fig. 2g(ii)
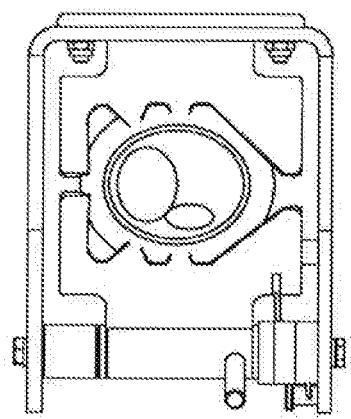
Fig. 2g(iii)
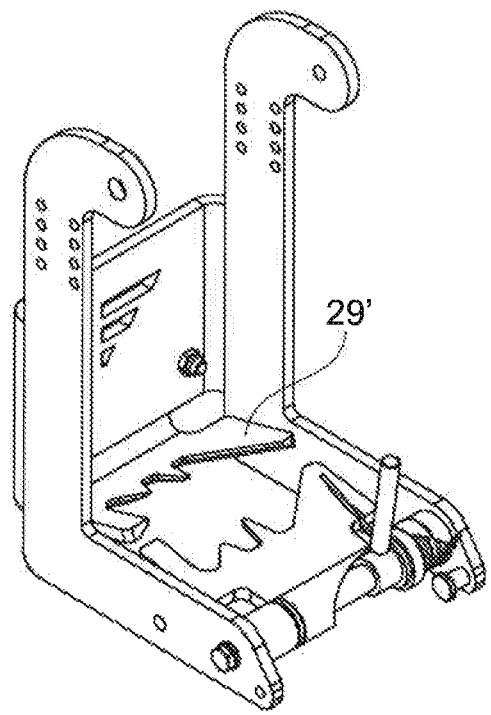
Fig. 2g(iv)

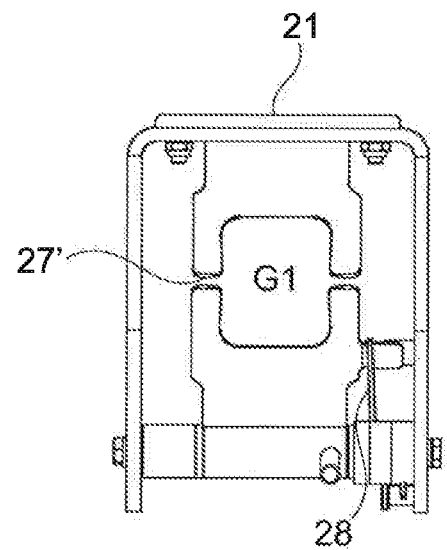
Fig. 2 h(i)
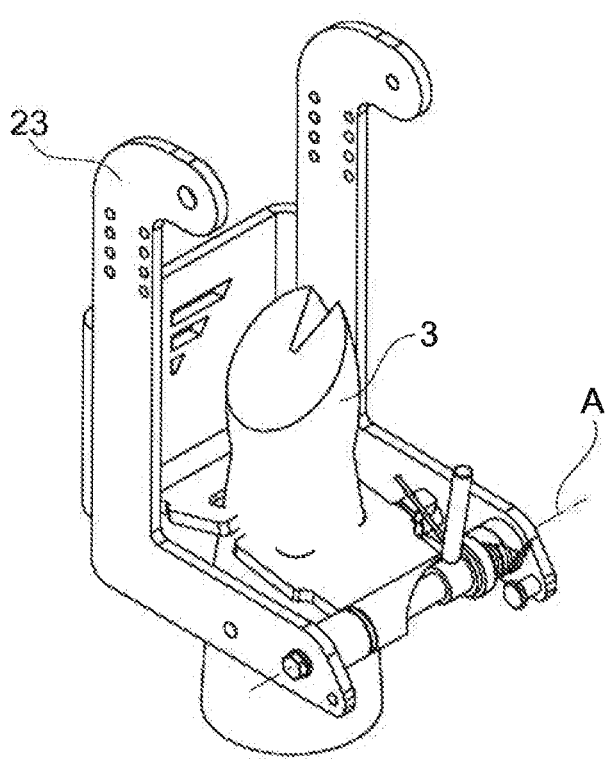
Fig. 2 h(ii)
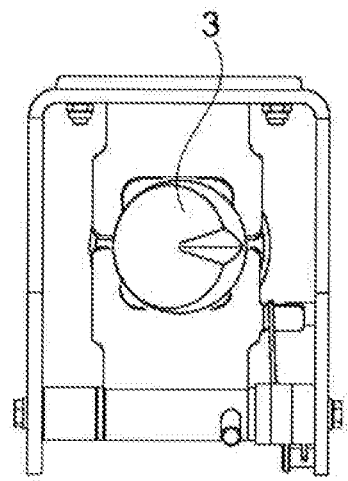
Fig. 2 h(iii)

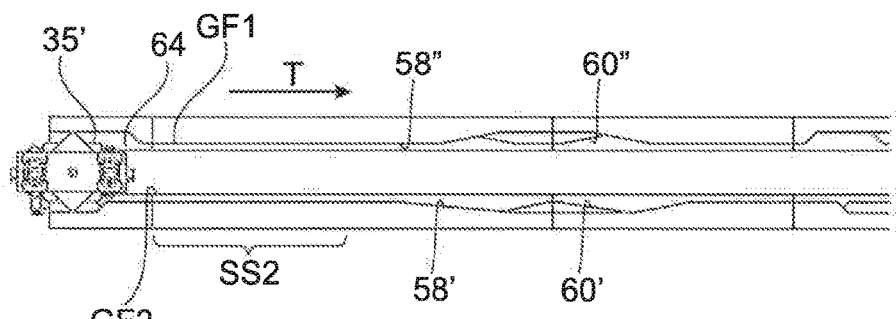
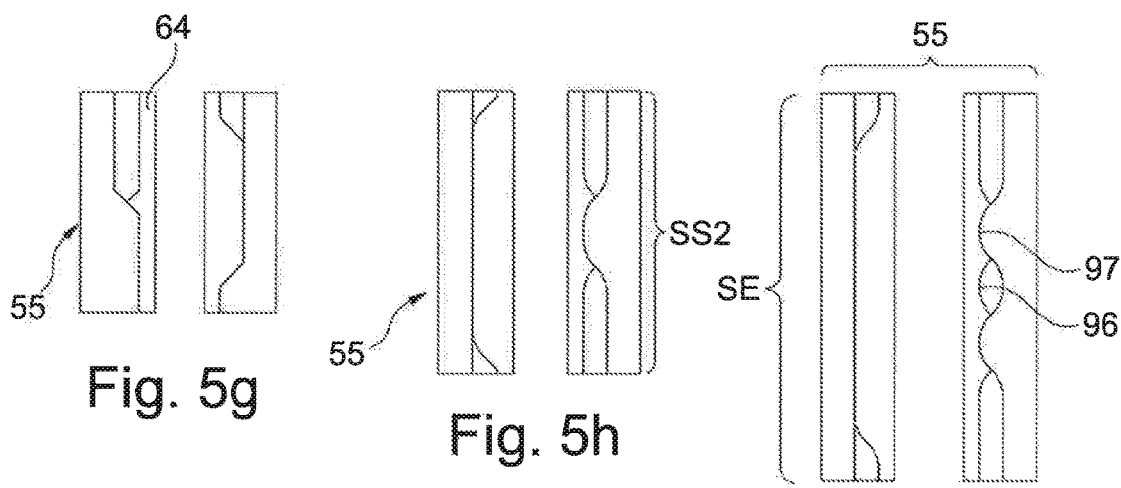
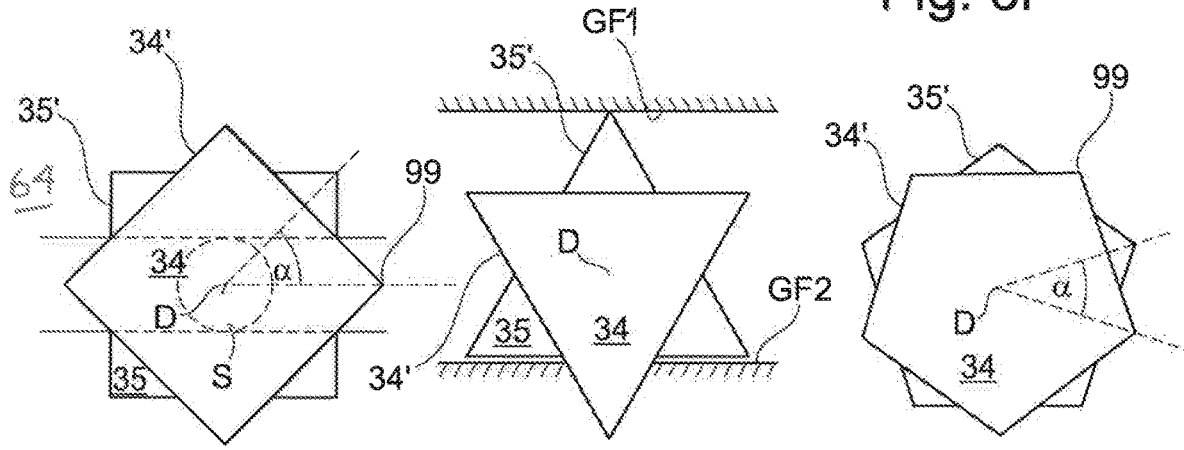

SLAUGHTERED PIG PART PROCESSING PLANT, AND A COUPLING FOR THE PLANT

This application is a national application out of Patent Cooperation Treaty Patent Application No. PCT/EP2020/056668, filed on Mar. 12, 2020, the entire contents of which are incorporated herein by reference.

This application claims under 35 U.S.C. § 119(a) the benefit of: 1) the filing date of Denmark Patent Application No. PA201970167, filed on Mar. 15, 2019, and 2) the filing date of Denmark Patent Application No. PA201970184, filed on Mar. 25, 2019, the entire contents of each of which are incorporated herein by reference.

BACKGROUND OF THE INVENTION

Field of the Invention

The present invention relates to a pig part processing plant.

Related Art

EP 1 658 774 discloses a plant as defined generally in the introductory portion of claim 1 herein. This plant has several limitations; among others the known plant requires a person to shift between different positions for processing the sides and the front, respectively, of the pig part passing through a processing station. EP 1191852 discloses a slaughtered animal processing plant with a gear for rotating a lower part of a coupling.

An object of the present invention is inter alia to provide an improved pig part processing plant wherein in a simple manner the pig parts may be correctly oriented by rotation about a vertical axis for processing.

SUMMARY

Thus, a plant is provided with pig part retaining clamp structures being connected to the conveyor so as to allow for a rotation of the clamp structures about a vertical axis, the processing plant including elongated guiding elements extending in the machine direction and engaging the clamp structures (or couplings connecting the clamp structures to the conveyor) as they are advanced in the machine direction, for bringing about a rotation about a vertical axis. Only a small rotation of the clamp structures need to be brought about before alignment with guiding faces that prevent or restrict the aforementioned rotation.

A processing plant may be defined e.g. by the combination of slaughtered pig part processing stations of an existing processing plant with a replacement conveyor with guiding elements as defined herein, or by using guiding elements as defined herein in an existing processing plant with a conveyor and slaughtered pig part processing stations.

BRIEF DESCRIPTION OF THE DRAWINGS

FIGS. 5a-l show details of second guiding elements and of the lower and upper bodies of the coupling.

DETAILED DESCRIPTION

The invention will now be explained in more detail below by reference to various embodiments.

FIG. 1a generally shows a side view of an embodiment of a slaughtered pig part processing plant 1 including an elongated frame 5 carrying a conveyor 10 that supports and advances a plurality of spaced apart pig part retaining assemblies referred to herein as clamp structures 20 or, for convenience, simply as "clamps".

Figure 7:
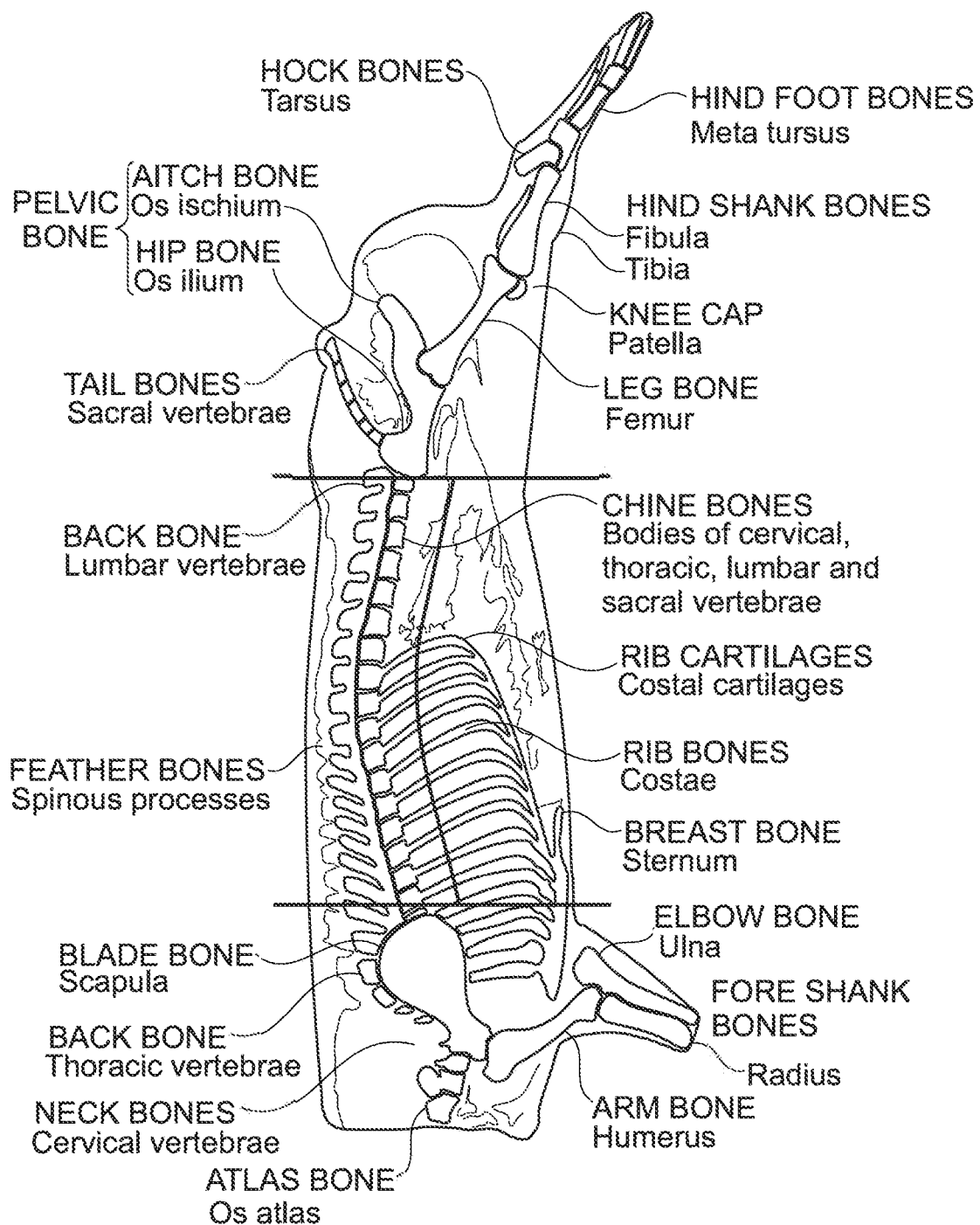
FIG. 7 is a general overview of the anatomy of a pig wherein either the upper third or the lower third thereof is processed using the processing plant and clamps of the invention.

Each clamp 20 is configured for holding a pig part, and the pig parts are advanced by the conveyor 10 in a general machine direction T from a first station 40, where a portion of the pig part is introduced automatically or manually between two jaws of the clamps 20, to a last station 600 where the bone of the processed pig part is removed automatically from the clamps 20. The pig part is normally a leg or shoulder part, such the hind shank with the hind foot or the fore shank, see FIG. 7.

Between the first station 40 and the last station 600 is a sequence of processing stations 100, 200, 300, 400, 500 for performing various cutting operations and for removing meat from the bone of the individual pig parts. In the shown embodiment the conveyor 10 of the plant 1 has a first section 11 extending at a relatively low level, and a second section 12 extending upwards to an overhead third section 13 next to which are the plurality of processing stations 100, 200, 300, 400, 500 as well as the last station 600. Normally, the conveyor 10 runs continuously, with pig parts 2 moving slowly past the processing stations as they are being processed.

As seen best in FIG. 1b, which is a top view of the plant of FIG. 1a, the conveyor 10 has a return part 16 returning the empty clamps 20 from the last station 600 to the first station 40 and extending between redirecting sections 14, 15. Preferably, the conveyor 10 is an endless structure, such as a chain, carrying the clamps 20 via couplings 30 and driven and guided by any conventional means, such as by rollers located at the redirecting sections 14, 15.

In one embodiment as shown in FIG. 1b, two independently operating processing plants 1 as described above may have their conveyors 10 positioned back to back and be operating with a respective one of the different types of clamps 20 described below, one plant 1 processing hind shanks and the other plant 1 processing fore shanks.

Figure 1C:
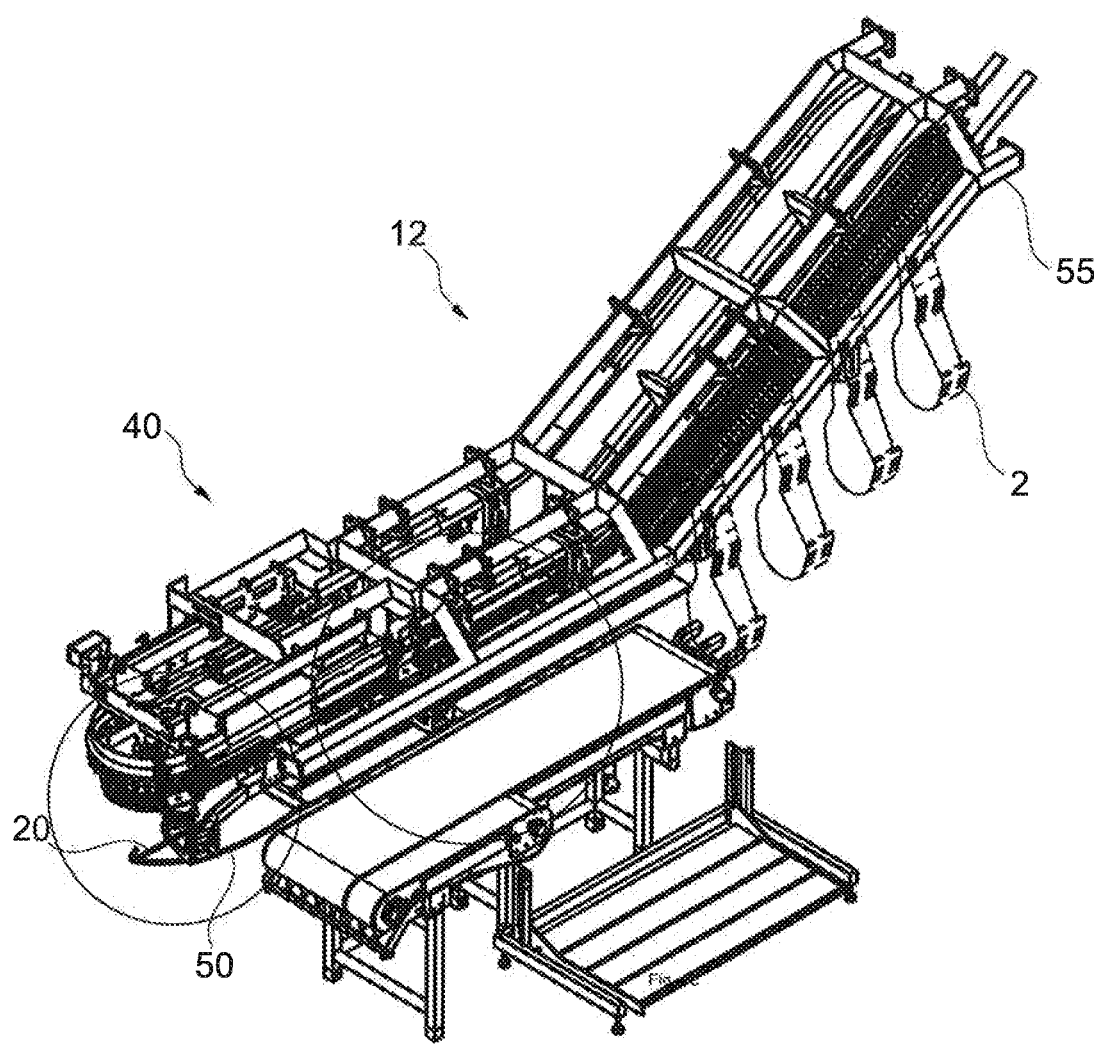
FIG. 1a is a side view of an embodiment of a slaughtered pig part processing plant, with a plurality of suspended clamps of the present invention.
FIG. 1b is a top view of the plant of FIG. 1a, FIG. 1c is a perspective view of a first and second section of the plant of FIG. 1a, FIGS. 2a-d show a first embodiment of a clamp of the present invention, in perspective, front, top and side views, respectively, FIG. 2c showing a gap G1 viewed from above

FIG. 1c is a perspective view of the first station 40, showing also a suspended pig part 2 being advanced from the first station 40 along the second conveyor section 12, held between the jaws of a clamp 20.

In the following, the clamps 20, a coupling 30 for coupling each clamp 20 to the conveyor 10, the first station 40, means for rotating the clamps 20 relative to the conveyor frame 5 about a generally vertical axis, and the last station 600 will be discussed.

FIGS. 2a-2d show a first embodiment of a clamp 10, which clamp 10 may find use in the plant of FIG. 1a or in any other slaughtered pig part processing plant of the general type that includes a conveyor frame with a conveyor for supporting a plurality of spaced apart pig part retaining assemblies and where the conveyor advances the pig parts in a machine direction from one station for introducing pig parts into the retaining assemblies, to a last station where the bones of the processed pig parts leave the retaining assemblies.

The clamps 20 are normally of a food compatible material, such as stainless steel or a synthetic material, and generally includes a connecting structure or carrier part 21 carrying two jaws 25, at least one being pivotable. The jaws 25 each have an elongated gripping edge 27 that preferably is serrated as shown, or sharpened, as well as a first face 29 and an opposite second face 29'. The jaws 25 are mounted to the carrier part 21 with their gripping edges 27 facing one another.

In the embodiment of FIGS. 2a-2d the two jaws 25 are each mounted for turning relative to the carrier part 21 about a respective axis A, from the shown first position resting against an abutment 21', in which first position the width w of a gap G1 between the opposite gripping edges 27 is relatively small, to second positions where gap G1 is opened up and the aforementioned width w becomes progressively larger. The maximum turning of the jaws 25 away from the first position is preferably limited by respective abutments 21".

Figure 2A:
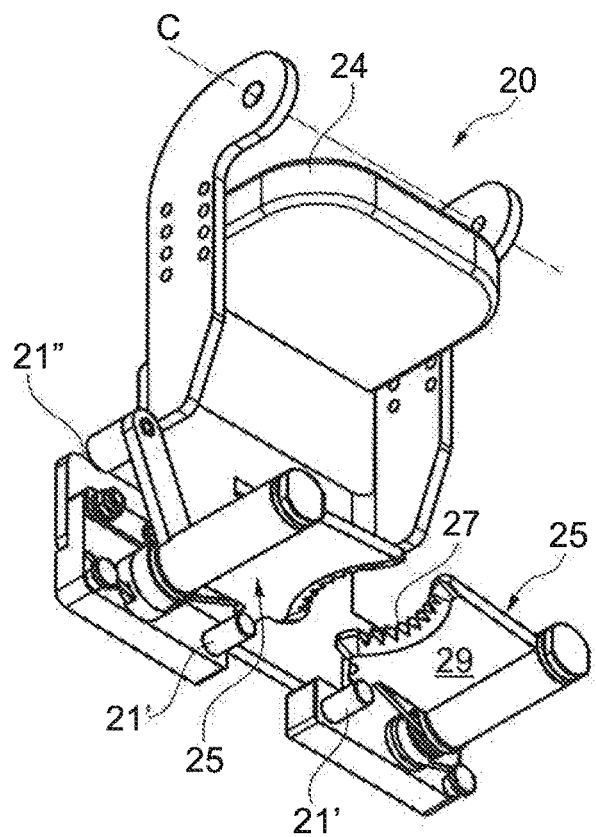
FIGS. 2e-f show another embodiment of the clamp of the present invention in a perspective view, without and with a pig part, FIGS. 2g(i-iv) and 2h(i-iii) show a third and a fourth embodiment, respectively, of the clamp of the present invention.
Figure 2D:
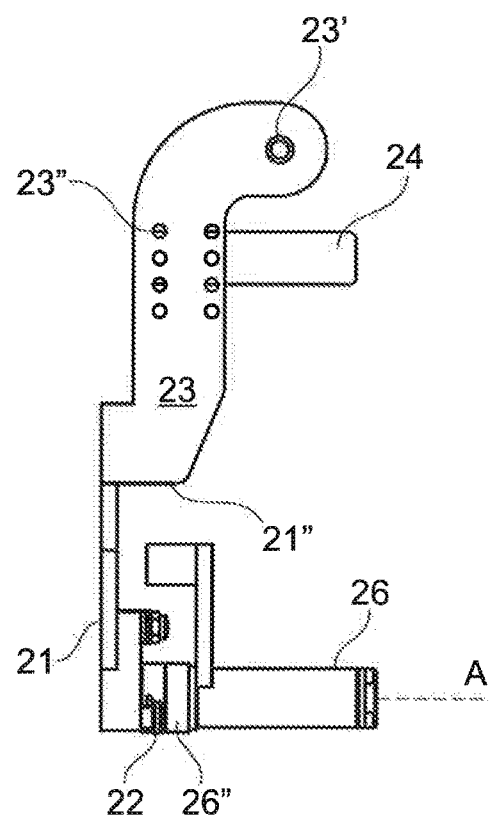
Figure 2B:
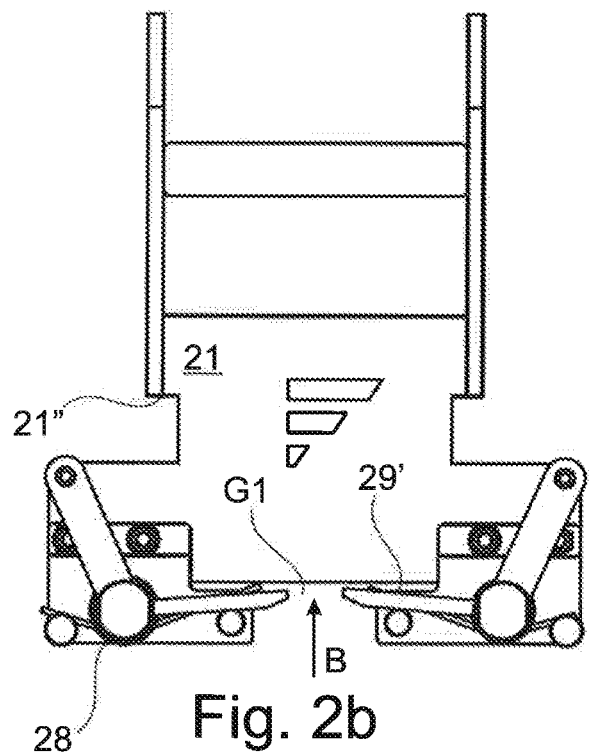
Figure 2C:
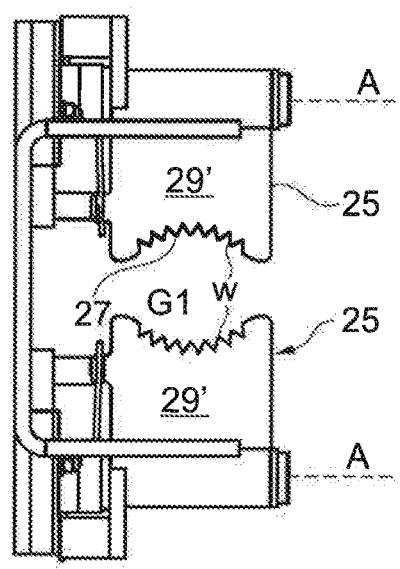

In the shown embodiment, the general contour of the gap G1, when viewed from above as in FIG. 2c, is oval; generally, the shape of the edges 27 is designed such that the contour of the gap G1 follows the cross-sectional periphery or outline of the inserted portion 3 of the pig part 2, see FIGS. 2f, 2g(ii) and 2h(ii), with teeth 27' arranged along the edges 27 biting into the pig part as explained below. The jaws 25 are normally formed from flat metallic plates and the jaw 25 edges 27 may be defined by replaceable parts.

Turning of the jaw(s) 25 from the first position is effected by applying a force against their first face 29, in the direction indicated by the arrow B in FIG. 2b, against a biasing force, such as that provided by a respective spring 28, biasing the respective jaw 25 towards the shown first position.

In the embodiment of FIGS. 2a-2d the carrier part 21 defines a rear plate and has two outwardly projecting pins 22 onto each of which a tubular structure 26, preferably open only at one end 26', connected to the jaws 25 opposite the gripping edge 27 thereof, is mounted. The spring 28, preferably being a wire wound around the respective pin 22 inside the tubular structure 26, is connected with the pin 22 or the rear plate 21 and with the jaw 25, to provide the aforementioned biasing force.

Two opposite, upright flanges 23 are generally mounted to the carrier part 21 and preferably have apertures 23" for variable positioning of a back-stop plate 24 for the reason explained below, as well as a respective aperture 23' or other structure for connecting the clamp 20 to a respective coupling 30. This connection is such as to allow the clamp 20 to be turned about a first axis C relative to the coupling 30 from a position wherein the first faces 29 are oriented more or less downwards as in FIG. 4d, to a position wherein the first faces 29 extend generally vertically, as will be the case at the first station 40, cf. FIGS. 4a-b, where the jaws 25 are in their first position, the clamp 20 being ready to receive a portion of a pig part 2 through applying a generally horizontal force in direction B against the faces 29.

Figure 2E:
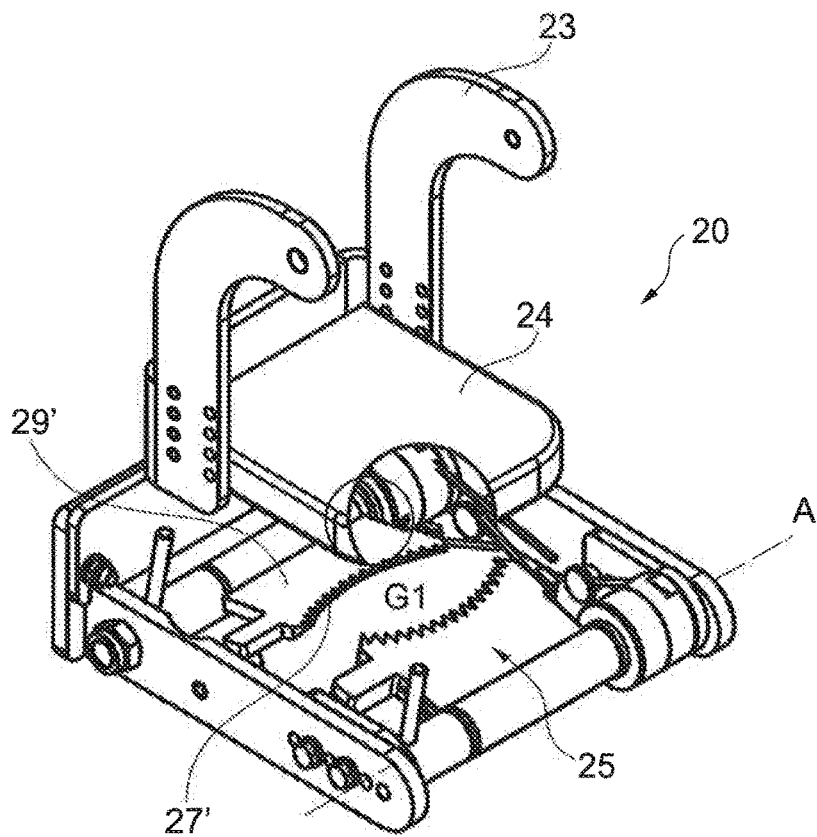
Figure 2F:
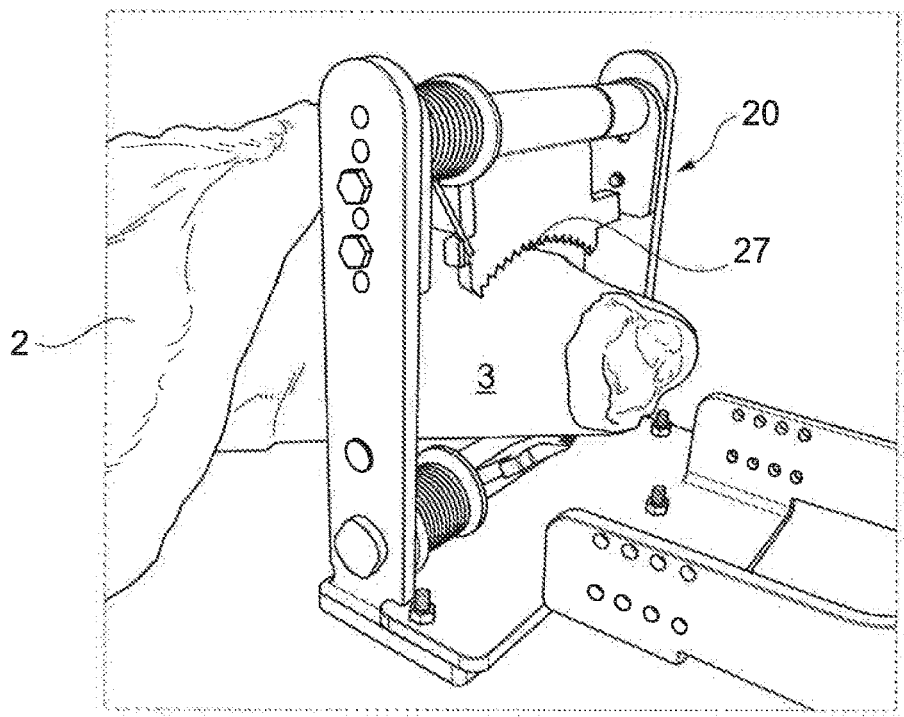

FIG. 2e shows a second embodiment of the aforementioned clamp 20 of the invention, of generally larger size than the one of FIGS. 2a-2d, for holding on to a relatively thicker pig part 2, such as portion 3 of a pig fore shank from which the foot has been previously removed, see FIG. 2f.

Figure 3A:
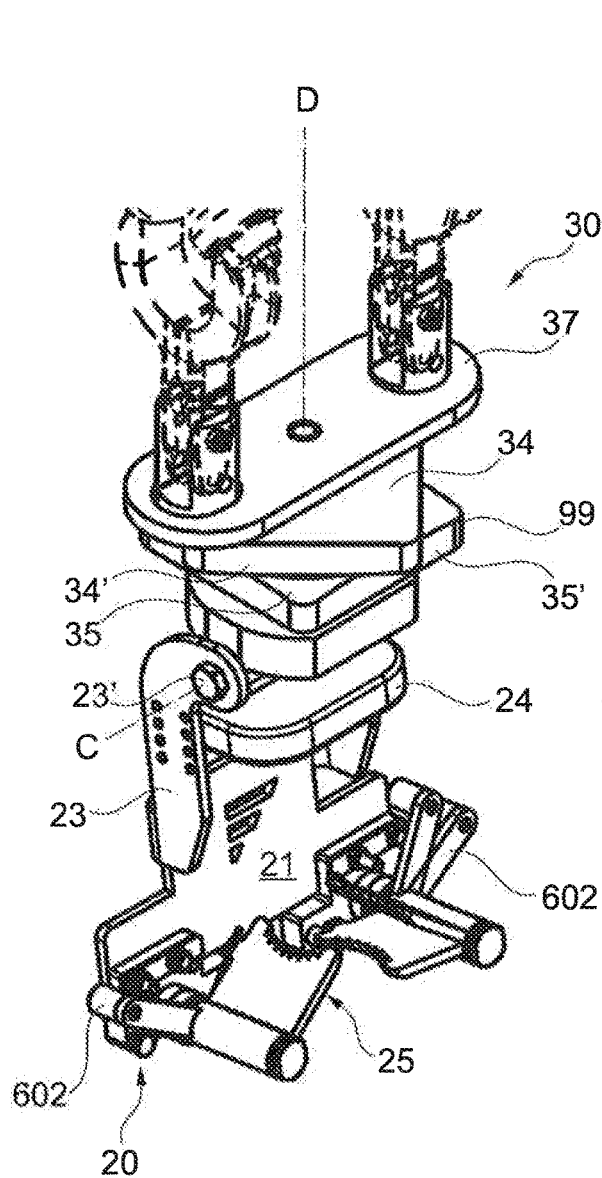
FIGS. 3a-b show an embodiment of the clamp of the invention connected to a coupling.
Figure 3B:
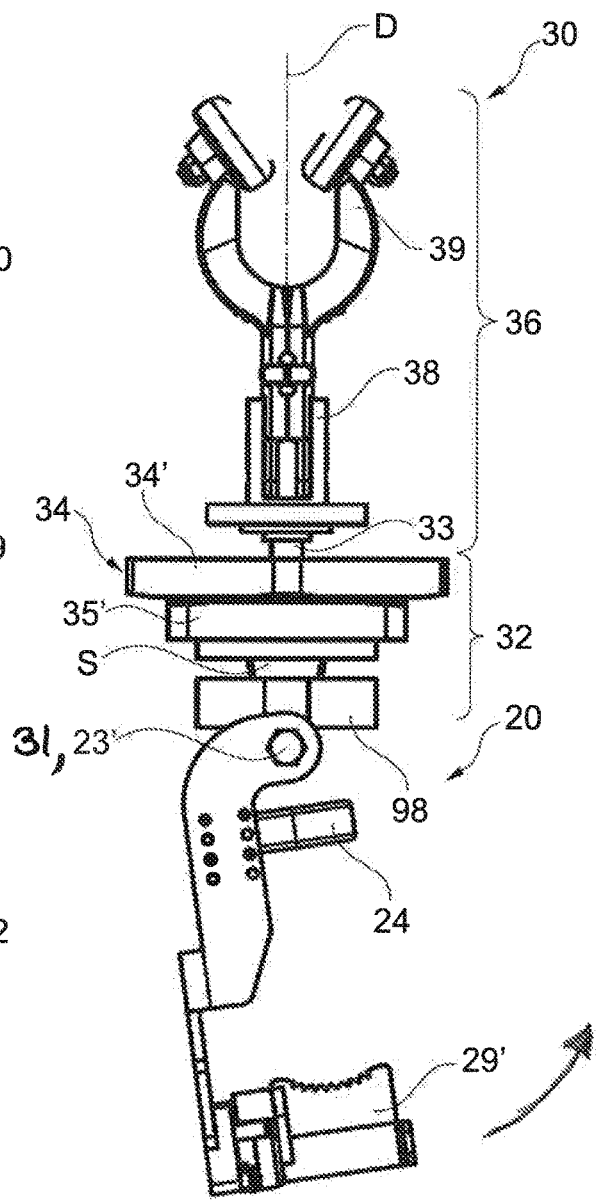

Turning now to FIGS. 3a and 3b an embodiment of a coupling 30 connecting the clamps 20 of the invention to the conveyor 10 will be discussed in further details; FIGS. 3a and 3b show the coupling 30 used in connection with the first embodiment of the clamps 20 but it may generally used with any of the clamp 20 embodiments disclosed herein.

FIGS. 3a and 3b are perspective and side views, respectively, of the clamp 20 pivotally mounted to a coupling 30 to allow for a rotation of the clamp 20 about the first axis C relative to the coupling 30. Preferably, this may be by a pin 31 attached to a lower structural part 32 of the coupling 30 and received by the aperture 23' of the flange 23 of the clamp 20. In this manner the clamp 20 may turn by an angle, such as 90° in the direction indicated by the arrow in FIG. 3b, to an orientation where the lower faces 29 are oriented generally vertically, for introducing a pig part 2 into the clamp 20 at the first station 40 in the manner described later below.

The lower structural part 32 on its side is rotatably mounted to an upper structural part 36 of the coupling 30 so as to allow for a turning of the lower structural part 32 relative to the upper structural part 36 about a second axis D which when processing the pig parts 2 is normally vertical and which is generally perpendicular to the first axis C. To allow for this turning movement, to the lower structural part 32 of the coupling 30 is mounted a pin 33 which is received by the upper structural part 36.

The upper structural part 36 on its side comprises a plate-like body 37 receiving the pin 33 in a manner allowing mutual rotation and having a number of sockets 38 to each of which is connected a bracket 39 engaging with the conveyor 10, which may be a chain. Relative turning about a generally horizontal axis between the bracket 39 and the sockets 38 may be provided for.

As may be understood, the first axis C and the second axis D normally extend generally horizontally and vertically, respectively, when the clamps 20 move in the machine direction T shown in FIG. 1a along the first section 11 and the third section 13 thereof.

The lower structural part 32 includes a lower body 35 immovably fixed to, or integral with, an upper body 34, which lower body 35 has a number of edges 35', referred to in the following as "second edges", that preferably are straight as shown. The lower body 35 also has a downward extension including the pin 31 extending through aperture 23' for connecting the lower structural part 32 with the clamp 20. The downward extension includes a circular stem portion S located above the latter pin 31.

The upper body 34 of the lower structural part 32 also has a number of edges 34', referred to in the following as "first edges", that preferably are straight and that correspond in number to the number of the second edges 35'. The second edges 35' are arranged at an angular offset α relative to the first edges 34' when viewed from above, see sectional views of FIGS. 5j-l. Preferably, for each of the upper and lower body 34, 35 the edges 34', 35' thereof meet at rounded or sharp corners 99, with the upper and lower body 34, 35 having the same contour and showing a rotational symmetry. The contour of the upper and lower bodies 34, 35 is generally that of an n-sided regular polygon, such as of an equilateral triangle, a square as in the embodiment of FIG. 3a-b, or a regular pentagon, the angular offset α being 60°, 45° or 36°, respectively, see also FIG. 5j-l.

As explained below, the plant 1 is preferably configured to provide for a turning of the clamps 20 about the vertical axis D as the clamps 20 move past the processing stations 100, 200, 300, 400, 500, such as by an angle of +/−90° or more, by the aforementioned edges 34', 35' and/or corners 99 of the upper and lower bodies 34, 35 alternatingly engaging dedicated second guiding elements 55 of the plant 1.

As seen in FIG. 1a the plant 1 includes first and second guiding elements 50, 55 that extend below and along respective portions of the first and third sections 11, 13 of the conveyor 10, and possibly also along the shown second portion 12, and serve to orient the clamps 20 as required, by giving rise to a turning of the clamps 20 about the first and second axes C and D, respectively, as the clamps 20 are advanced by the conveyor 10. The second guiding elements 55 that act on the lower structural part 32 for turning about axis D will be described later herein.

Figure 4A:
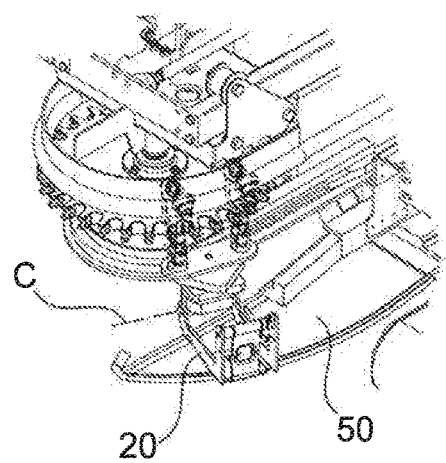
FIGS. 4a-b show details of a first station of the plant, with a clamp of the invention turned to a horizontal position sliding on first guiding elements.

Before reaching the first station 40 the empty clamps 20 have been appropriately turned about the aforementioned vertical axis D by the second guiding elements 55, that are positioned along the return part 16 of the conveyor 10, interacting with the lower structural part 32, and are by action of the first guiding elements 50 presented now as shown in FIG. 4a to an operator standing alongside the conveyor 10 next to a loading table 44 of the first station 40, with the first axis C extending essentially horizontal and parallel with the machine direction T.

The first guiding elements 50 include a fixed elongated ramp-like guiding face, seen best in FIG. 4a, extending at a gradually increasing angle to the vertical and configured for turning, by physical contact with the carrier part 21, the moving clamp 20 about the axis C from the orientation shown generally in FIG. 3b to the orientation shown in FIG. 4a with the first jaw faces 29 extending generally vertically, facing the operator standing in front of the table 44. The clamp 20 is preferably held in this configuration by the elongated first guiding element 50, on top of an essentially horizontal face portion of the first guiding elements 50, on moving through the first station 40 along the table 44.

Figure 4B:
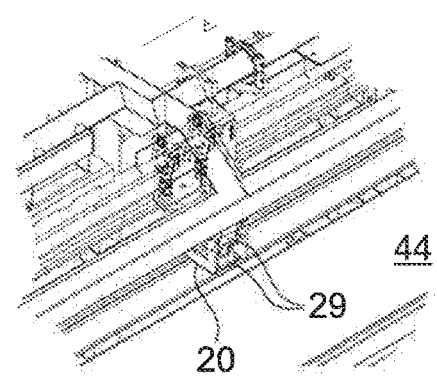
Figure 4C:
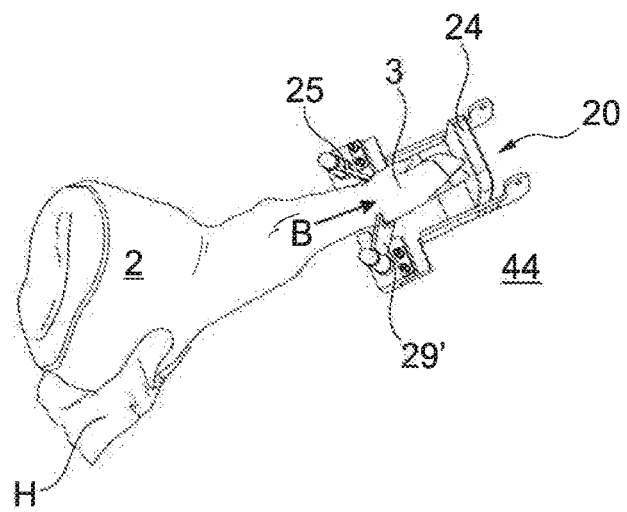
FIGS. 4c-d show the clamp holding a pig part, in the position of FIG. 4b and hanging freely, respectively.

FIG. 4c is a perspective view showing a pig part 2 pushed or loaded by an operator into the gap G1 between the jaws 25, the pig part 2 still supported by the table 44 of the first processing station 40. For this, turning the jaws 25 from their first position has been effected by the operator holding the pig part 2 with his hand H and forcing the tip of the pig part 2, shown here as the pig hind leg 3, against the respective first face 29 of the two jaws 25, applying thereby a force in direction B. Proper dimensioning will ensure that for any conventional slaughtered pig the tip 3 of the pig part 2 affects a turning movement of the jaw(s) 25 against the spring 28 from the first position of the jaw(s) 25. Moreover, by designing the gap G1 such that, as shown in FIG. 2c, the general contour of the gap G1 is somehow oval or with any similar appropriate shape it is ensured that the opposed edges 27 of the jaws 25 will bite into the pig part 2 along a substantial part of the periphery thereof. This will prevent or restrict free removal of the pig part 2 from the clamp 20, until the jaws 25 are manually or automatically forced to turn against the biasing force of the spring 28, which will typically happen at the last station 600 as explained further below.

As seen in FIG. 4c, the pig part 2 is inserted between the jaws 25 until the toe or tip 3 thereof contacts the back-stop plate 24. Positioning the back-stop plate 24 relative to the position of the jaws 25 by the flange 23 apertures 23" or other suitable connecting means allows for the maximum insertion of the foot part 3 to be adjusted, depending of the pig size.

Figure 4D:
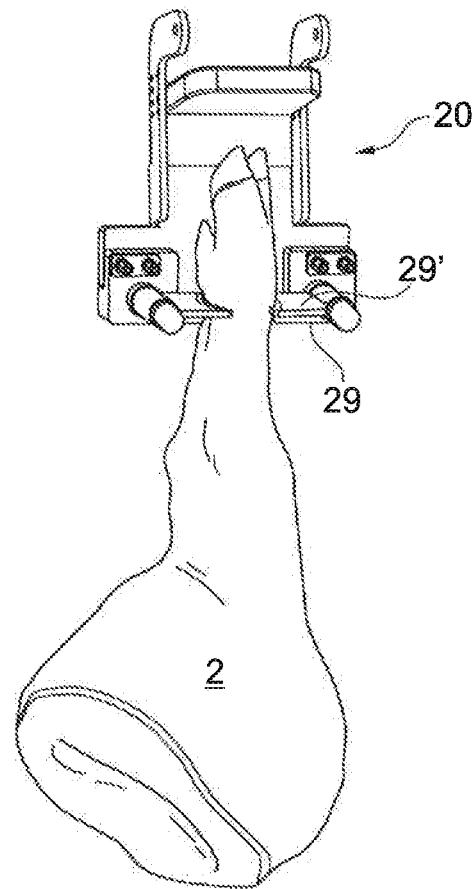

As the clamp 20 with the pig part 2 held by the action of the spring 28, moves further forward in direction T to leave the first guiding elements 50 the clamp 20 is no longer held in the turned position shown in FIG. 4b. Consequently, the clamp 20 will turn back about the first axis C, normally by the action of gravity alone, to a position as shown in FIG. 4d with the first face 29 of the jaws 25 oriented again generally downwards, carrying the pig part 2 up along the second section 12 of the conveyor, see FIG. 1c. At this time the weight of the pig part 3 will cause a further biting of the opposite edges 27 of the jaws 25 into the meat of the pig part 2, allowing the jaws 25 to turn further towards their first position, effectively holding on to the pig part 2 with a stronger force.

It is realized that a spring 28 as discussed above may not be necessary in all instances since the pull by gravity on the pig part 2 suspended from the clamp 20 will provide the same bite; for that case means (not shown) may be provided at the first station 40 for ensuring that the jaws 25 do not turn freely, but with some resistance by an external force, about the respective axis A on insertion of the pig part 2.

It will also be understood that the biting of the jaws 25 into the pig part 2 may also be achieved in embodiments where one of the jaws 25 is fixed while only the opposite jaw 25 is pivotally arranged to turn against the action of a spring 28. Such embodiments are shown in FIGS. 2g(i-iv) and 2h(i-iii), with and without a pig part held between the jaws 25. As shown, one of the jaws 25 is welded or otherwise fixedly connected to the carrier part 21, extending at a slight angle to the horizontal. FIG. 2g(iii) shows the edges 27 being preferably sharpened, and provided with a serration defined only by a few projecting teeth or prongs 27' that extend into the pig part 2 flesh between the bones of the fore or hind leg. Alternatively, for holding a pig part 2 including a foot 3 an embodiment as shown in FIG. 2h(i-iii) may be preferred, wherein the grip is more even around the foot 3 to reduce product damage.

As shown in FIG. 1a, extending below the second 12 and third section 13 of the conveyor 10 and along therewith is a track structure SE with the aforementioned second guiding elements 55, normally being defined by a sequence of first type groups SS1, each with two subset of guiding faces for effecting a predefined pattern of rotations about the upright axis D of the clamps 20, and second type groups SS2 each including a guiding face for preventing rotation about the axis D of the clamps 20. Such groups of the track structure SE are shown cut away from adjacent groups for illustrative purposes in FIG. 5a, with a coupling 30 advanced by the conveyor 10 moving along one first type group SS1 before entering a rotation preventing downstream second type group identified as SS2 and then a downstream, first type group SS1 for bringing about a further rotation about the vertical axis D.

Figure 5A:
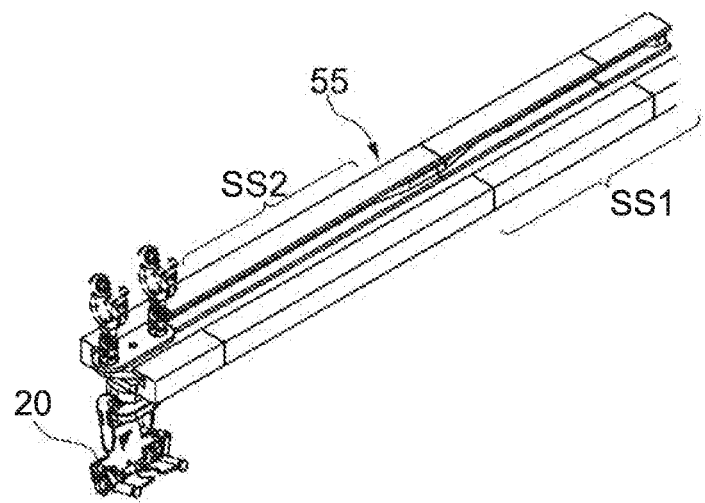
Figure 5B:
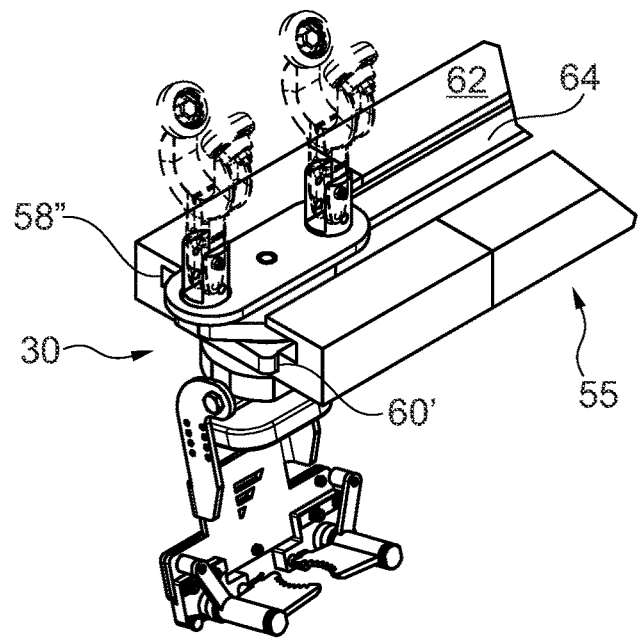
Figure 5C:
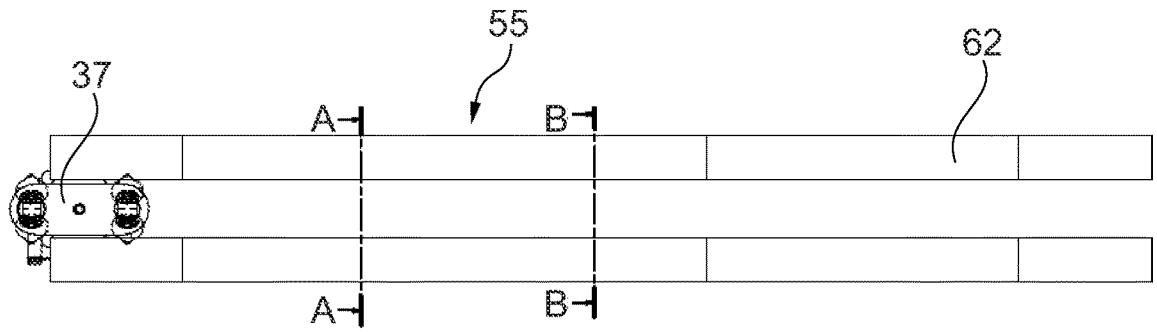
Figures 5D, 5E:
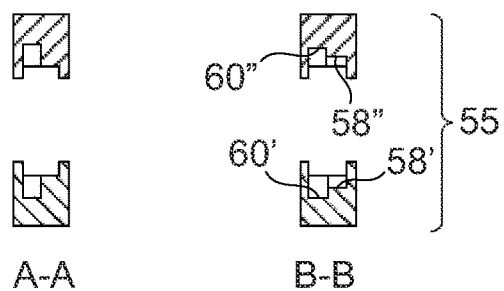

As seen in FIG. 5b which is an enlarged perspective cross-sectional view of two groups of guiding faces of FIG. 5a, and in FIG. 5e, two subsets of guiding faces generally may comprise pairs of opposite first elongated guiding faces 58', 58" at one vertical level for contacting the aforementioned first edges 34' of the lower structural part 32 and pairs of opposite second elongated guiding faces 60', 60" at lower vertical level for contacting the aforementioned second edges 35'. The pairs of first and second guiding faces 58', 58", 60', 60" are arranged at a respective level, corresponding to the respective level below the conveyor 10 at which the first and second edges 34', 35' are advanced in the machine direction T, and serve to, upon sliding engagement with a corresponding edge 34', 35', rotate the lower structural part 32 with the clamp 20 relative to the upper structural part 36 about the vertical second axis D. Such a rotation by 90° may preferably take place as the clamp 20 leaves the first section 10, so that the horizontal first axis C then extends generally perpendicular to the machine direction T and the pig part 2 faces the direction of movement T as it moves along the second section 12, see FIG. 1c.

A rotation about the vertical second axis D may in particular be desirable for processing different surface portions of the suspended pig parts 2 at a given processing station 100, 200, 300, 400, 500, by guiding faces of selected configuration being located at the processing station. The lengthwise configuration of the guiding faces of one group SS1 may then vary along the extension of the processing station in the machine direction T, to rotate the pig part 2 about the vertical axis D as it passes through the processing station, see FIGS. 5h and 5i. FIG. 5i shows the first and second guiding faces that act together with the lower structural part 32 to provide a rack and pinion structure, with spaced apart upper teeth or rounded projections 97 and lower teeth or rounded projections 96 defining in part the respective first and second guiding faces 58', 60' along one side of the group SS1, at different vertical levels.

The subelement configuration shown in FIG. 5i allows for a progressive rotation of the pig part 2 of four times 45° as the pinion defined by the lower structural part 32 with tooth-like corners 99 passes along the processing station, thereby allowing processing of different surface portions of the pig part; as will be understood the upper and lower bodies 34, 35 alternatingly engage a corresponding subset of guiding faces to progressively bring about the rotation of the lower structural part 32 up to a predetermined angle of rotation when the coupling 30 is advanced in the machine direction T past the two subsets defining the first type group SS1.

As seen best in FIG. 5f the opposite guiding faces 58', 58", 60', 60" of the pairs defining a subset may alternatingly converge and diverge in the machine direction T, to control and initiate the rotation about the vertical axis D by sliding contact with the edges 34', 35' and/or corners 99 of the upper and lower body 34, 35. A base portion 64 of the track structure SE may be provided having an elongated track receiving the circular stem portion S of the lower structural part 32 located below the lower body 35, for providing sideways support for the coupling 30, see FIG. 5j. A top cover plate 62 not shown in FIG. 5f may be provided with a similar elongated track, for the same purpose.

As will be understood from the above, normally one guiding face 58', 60' configuration of one or the other of the aforementioned subsets will contact one of the corners 99 of the lower structural part 32 for initiating and temporarily maintaining a clockwise or anti-clockwise turning movement about the vertical axis D as the coupling 30 is advanced in the machine direction T, and an opposite guiding face 58", 60" configuration arranged downstream may then later contact another one of the corners of the lower structural part 32, for initiating and temporarily maintaining a further clockwise or anti-clockwise turning movement about the vertical axis D as the coupling 30 is advanced further in the machine direction T along a group SS1.

Preferably, the second guiding elements 55 are configured such that after completion of rotation of the lower structural part 32 about the vertical axis D by a desired angle some of the guiding faces will prevent any further, undesired rotation about the vertical axis D. This may be by the contact shown in FIG. 5b of two directly opposed upper or lower body 34, 35 edges 34', 35', as in the case of upper and lower bodies 34, 35 with a square contour, with linear portions of the guiding faces oriented parallel with the machine direction T and defining the aforementioned second group SS2, or by contact of one straight edge and an opposite corner 99, which may be the case where the upper and lower bodies have a triangular or pentagon outline, with such linear portions GF1, GF2 oriented parallel with the machine direction T, of the guiding faces, see FIGS. 5f and 5k.

Figure 6:
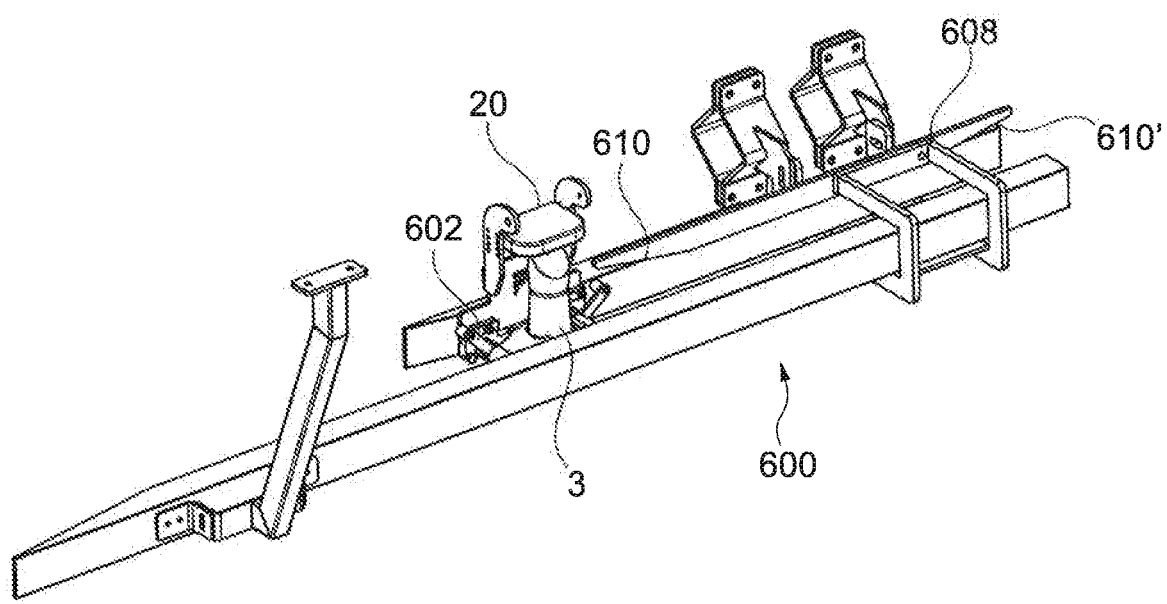
FIG. 6 is a perspective view of a last station of the processing plant.

In FIG. 6 is shown the aforementioned last station 600 of the plant 1, wherein an activating element 610 is arranged on an elongated structure 608, to mechanically engage an arm 602 mounted onto each of the jaws 25 of the clamps 20 as the clamps 20 move along the overhead, third conveyor section 13. The pig part at this point has had most or all meat removed at the processing stations 100, 200, 300, 400, 500, and so the remaining portion still held by the clamp generally comprises only the bone, such as the hock bones or the fore shank bones shown in FIG. 7, depending on whether the situation shown in FIG. 2f or in FIG. 4c applies.

On the respective arm 602 contacting the activating element 610, which is the shown embodiment is constituted by an inclined, generally downwardly oriented face in direction T, the jaws 25 are first turned about their respective axis A against the force of the springs 28, to widen the gap G1, thereby allowing the pig part to be dropped from the clamp 20, into a collecting bin 601 as shown in FIG. 1a. A further downwardly oriented face 610' gradually releases engagement with the arms 602, thereby returning the jaws 25 to their first position shown in FIGS. 2a-d, whereafter the clamps 20 are returned to the first station 40, ready to receive another pig part 2.

It is noted that according to the invention the principles relating to the elongated second guiding elements 55 discussed herein may be used for the described reorienting of any type of pig part retaining assembly, such as the one disclosed in FIG. 22D of EP10803166.7, when fitted with a correspondingly configured structural part 32.

The invention claimed is:
1. A slaughtered pig part processing plant comprising:
a plurality of pig part processing stations; and
a conveyor supporting, via respective couplings, spaced apart clamp structures for carrying pig parts, said conveyor advancing said couplings with a respective one of said clamp structures for each of said couplings in a machine direction (T);
said couplings each comprising an upper structural part and a lower structural part connected with said respective one of said clamp structures, said lower structural part being mounted for rotation about a vertical axis (D) relative to said upper structural part;
said lower structural part comprising:
an upper body having a periphery defined by a number of first edges extending at a first level;
a lower body having a periphery defined by a number of second edges extending at a lower second level; and wherein said upper body and said lower body are fixed to one another, said periphery of said upper body and said periphery of said lower body are identical, said upper body being angularly offset at an angle (a) about said vertical axis (D) relative to said lower body, and said respective one of said clamp structures is fixed to said lower body;
a first subset of guiding faces at said first level for engaging said upper body to bring about a rotation about said vertical axis (D) when said coupling is advanced in said machine direction (T) past said first subset of guiding faces;
a second subset of guiding faces at said lower second level for engaging said lower body to bring about a rotation about said vertical axis (D) when said coupling is advanced in said machine direction (T) past said second subset of guiding faces; and
wherein upstream or downstream of said first subset of guiding faces and said second subset of guiding faces, a group comprising at least one elongated guiding face extending along said machine direction (T) at one or the other of said first level and said lower second level, for preventing or restricting said rotation of said lower structural part by engagement with an edge of said upper body or said lower body.

2. The slaughtered pig part processing plant according to claim 1, wherein said first subset of guiding faces and the second subset of guiding faces are arranged together as a group along said machine direction (T), and said upper body and said lower body of said respective one of said clamp structures alternatingly engage said first subset of guiding faces and said second subset of guiding faces to progressively bring about said rotation of said lower structural part about said vertical axis (D) up to a predetermined angle of rotation when said coupling is advanced in said machine direction (T) past said group.

3. The slaughtered pig part processing plant according to claim 1, said at least one elongated guiding face comprising an entry portion for aligning at least one of said first edges and said second edges with said at least one elongated guiding face by engaging said upper body or said lower body to bring about a rotation about said vertical axis (D) of said lower structural part when said coupling is advanced in said machine direction (T) past said entry portion.

4. The slaughtered pig part processing plant according to claim 1, wherein for each of said first body and said second body said number of first edges and said number of second edges meet at rounded or sharp corners, said number of first edges and said number of second edges being straight.

5. The slaughtered pig part processing plant according to claim 1, wherein said lower body being pivotally connected to a top portion of said respective one of said clamp structures to allow for rotation of said respective one of said clamp structures relative to said lower body about a horizontal axis (C).

6. A slaughtered pig part processing plant comprising:
a plurality of pig part processing stations; and
a conveyor supporting, via respective couplings, spaced apart clamp structures for carrying pig parts, said conveyor advancing said couplings with a respective one of said clamp structures for each of said couplings in a machine direction (T);
said couplings each comprising an upper structural part and a lower structural part connected with said respective one of said clamp structures, said lower structural part being mounted for rotation about a vertical axis (D) relative to said upper structural part;
said lower structural part comprising:
an upper body having a periphery defined by a number of first edges extending at a first level;
a lower body having a periphery defined by a number of second edges extending at a lower second level; and
wherein said upper body and said lower body are fixed to one another, said periphery of said upper body and said periphery of said lower body are identical, said upper body being angularly offset at an angle (a) about said vertical axis (D) relative to said lower body, and said respective one of said clamp structures is fixed to said lower body;
a first subset of guiding faces at said first level for engaging said upper body to bring about a rotation about said vertical axis (D) when said coupling is advanced in said machine direction (T) past said first subset of guiding faces;
a second subset of guiding faces at said lower second level for engaging said lower body to bring about a rotation about said vertical axis (D) when said coupling is advanced in said machine direction (T) past said second subset of guiding faces; and
wherein upstream and/or downstream of said first subset of guiding faces and said second subset of guiding faces, a group of two elongated guiding faces arranged opposite one another and extending along said machine direction (T), both of said two elongated guiding faces at one or the other of said first level and said lower second level, for preventing or restricting said rotation by engagement with an edge of said upper body or said lower body.

7. The slaughtered pig part processing plant according to claim 6, each of said two elongated guiding faces comprises an entry portion for aligning at least one of said first edges and said second edges with said two elongated guiding faces by engaging said upper body or said lower body to bring about a rotation about said vertical axis (D) of said lower structural part when said coupling is advanced in said machine direction (T) past said entry portion.

8. The slaughtered pig part processing plant according to claim 6, wherein said first subset of guiding faces and the second subset of guiding faces are arranged together as a group along said machine direction (T), and said upper body and said lower body of said respective one of said clamp structures alternatingly engage said first subset of guiding faces and said second subset of guiding faces to progressively bring about said rotation of said lower structural part about said vertical axis (D) up to a predetermined angle of rotation when said coupling is advanced in said machine direction (T) past said group.

9. The slaughtered pig part processing plant according to claim 6, wherein for each of said first body and said second body said number of first edges and said number of second edges meet at rounded or sharp corners, said number of first edges and said number of second edges being straight.

10. The slaughtered pig part processing plant according to claim 6, wherein said lower body being pivotally connected to a top portion of said respective one of said clamp structures to allow for rotation of said respective one of said clamp structures relative to said lower body about a horizontal axis (C).

11. A slaughtered pig part processing plant comprising:
a plurality of pig part processing stations; and
a conveyor supporting, via respective couplings, spaced apart clamp structures for carrying pig parts, said conveyor advancing said couplings with a respective one of said clamp structures for each of said couplings in a machine direction (T);

said couplings each comprising an upper structural part and a lower structural part connected with said respective one of said clamp structures, said lower structural part being mounted for rotation about a vertical axis (D) relative to said upper structural part;

said lower structural part comprising:
- an upper body having a periphery defined by a number of first edges extending at a first level;
- a lower body having a periphery defined by a number of second edges extending at a lower second level; and
- wherein said upper body and said lower body are fixed to one another, said periphery of said upper body and said periphery of said lower body are identical, said upper body being angularly offset at an angle (α) about said vertical axis (D) relative to said lower body, and said respective one of said clamp structures is fixed to said lower body;
- a first subset of guiding faces at said first level for engaging said upper body to bring about a rotation about said vertical axis (D) when said coupling is advanced in said machine direction (T) past said first subset of guiding faces;
- a second subset of guiding faces at said lower second level for engaging said lower body to bring about a rotation about said vertical axis (D) when said coupling is advanced in said machine direction (T) past said second subset of guiding faces;
- wherein said periphery of said upper body and said periphery of said lower body each being a regular n-sided polygon with said angle α having a value of 360/(2×n)°, wherein n is an integer and is greater than or equal to 3.

12. The slaughtered pig part processing plant according to claim 11, wherein said first subset of guiding faces and the second subset of guiding faces are arranged together as a group along said machine direction (T), and said upper body and said lower body of said respective one of said clamp structures alternatingly engage said first subset of guiding faces and said second subset of guiding faces to progressively bring about said rotation of said lower structural part about said vertical axis (D) up to a predetermined angle of rotation when said coupling is advanced in said machine direction (T) past said group.

13. The slaughtered pig part processing plant according to claim 11, wherein for each of said first body and said second body said number of first edges and said number of second edges meet at rounded or sharp corners, said number of first edges and said number of second edges being straight.

14. The slaughtered pig part processing plant according to claim 11, wherein said lower body being pivotally connected to a top portion of said respective one of said clamp structures to allow for rotation of said respective one of said clamp structures relative to said lower body about a horizontal axis (C).

15. A coupling comprising:
- an upper structural part configured for connection with an overhead conveyor; and
- a lower structural part comprising a clamp structure for a slaughtered pig part, wherein said lower structural part being mounted for rotation about a vertical axis (D) relative to said upper structural part; said lower structural part comprising:
  - an upper body having a periphery defined by a number of first edges; and
  - a lower body having a periphery defined by a number of second edges; and
  - wherein said upper body and said lower body are fixed to one another, said periphery of said upper body and said periphery of said lower body are identical, said upper body being angularly offset at an angle (α) about said vertical axis (D) relative to said lower body, and said clamp structure pivotally connected to said lower body; and
- wherein said number of first edges and said number of second edges meeting at rounded or sharp corners, and wherein said number of first edges and said number of second edges being straight; and
- wherein said periphery of said upper body and said periphery of said lower body each being a regular n-sided polygon with said angle α having a value of 360/(2×n)°, wherein n is an integer and is greater than or equal to 3.

16. The coupling according to claim 15, wherein said first subset of guiding faces and the second subset of guiding faces are arranged together as a group along said machine direction (T), and said upper body and said lower body of said respective one of said clamp structures alternatingly engage said first subset of guiding faces and said second subset of guiding faces to progressively bring about said rotation of said lower structural part about said vertical axis (D) up to a predetermined angle of rotation when said coupling is advanced in said machine direction (T) past said group.

17. The coupling according to claim 15, wherein for each of said first body and said second body said number of first edges and said number of second edges meet at rounded or sharp corners, said number of first edges and said number of second edges being straight.

18. The coupling according to claim 15, wherein said lower body being pivotally connected to a top portion of said respective one of said clamp structures to allow for rotation of said respective one of said clamp structures relative to said lower body about a horizontal axis (C).

19. A slaughtered pig part processing plant comprising:
- a plurality of pig part processing stations; and
- a conveyor supporting, via respective couplings, spaced apart clamp structures for carrying pig parts, said conveyor advancing said couplings with a respective one of said clamp structures for each of said couplings in a machine direction (T);

said couplings each comprising an upper structural part and a lower structural part connected with said respective one of said clamp structures, said lower structural part being mounted for rotation about a vertical axis (D) relative to said upper structural part;

said lower structural part comprising:
- an upper body having a periphery defined by a number of first edges extending at a first level;
- a lower body having a periphery defined by a number of second edges extending at a lower second level; and
- wherein said upper body and said lower body are fixed to one another, said periphery of said upper body and said periphery of said lower body are identical, said upper body being angularly offset at an angle (α) about said vertical axis (D) relative to said lower body, and said respective one of said clamp structures is fixed to said lower body;
- a first subset of guiding faces at said first level for engaging said upper body to bring about a rotation about said vertical axis (D) when said coupling is advanced in said machine direction (T) past said first subset of guiding faces;

a second subset of guiding faces at said lower second level for engaging said lower body to bring about a rotation about said vertical axis (D) when said coupling is advanced in said machine direction (T) past said second subset of guiding faces;

wherein said first subset of guiding faces and the second subset of guiding faces are arranged together as a group (SS1) along said machine direction (T), and said upper body and said lower body of said respective one of said clamp structures alternatingly engage said first subset of guiding faces and said second subset of guiding faces to progressively bring about said rotation of said lower structural part about said vertical axis (D) up to a predetermined angle of rotation when said coupling is advanced in said machine direction (T) past said group (SS1);

upstream or downstream of said first subset of guiding faces and said second subset of guiding faces, a second group (SS2) comprising at least one elongated guiding face (GF1) extending along said machine direction (T) at one or the other of said first level and said lower second level, for preventing or restricting said rotation of said lower structural part by engagement with an edge of said upper body or said lower body;

wherein said at least one elongated guiding face comprising an entry portion for aligning at least one of said first edges and said second edges with said at least one elongated guiding face by engaging said upper body or said lower body to bring about a rotation about said vertical axis (D) of said lower structural part when said coupling is advanced in said machine direction (T) past said entry portion.

20. The slaughtered pig part processing plant according to claim 19, wherein said first subset of guiding faces and the second subset of guiding faces are arranged together as a group along said machine direction (T), and said upper body and said lower body of said respective one of said clamp structures alternatingly engage said first subset of guiding faces and said second subset of guiding faces to progressively bring about said rotation of said lower structural part about said vertical axis (D) up to a predetermined angle of rotation when said coupling is advanced in said machine direction (I) past said group.

21. The slaughtered pig part processing plant according to claim 19, wherein for each of said first body and said second body said number of first edges and said number of second edges meet at rounded or sharp corners, said number of first edges and said number of second edges being straight.

22. The slaughtered pig part processing plant according to claim 19, wherein said lower body being pivotally connected to a top portion of said respective one of said clamp structures to allow for rotation of said respective one of said clamp structures relative to said lower body about a horizontal axis (C).

* * * * *